United States Patent [19]

Okano

[11] 4,355,850
[45] Oct. 26, 1982

[54] BEARING OF A TURBOMACHINE

[75] Inventor: Hiroshi Okano, Mishima, Japan

[73] Assignee: Toyota Jidosha Kogyo Kabushiki Kaisha, Aichi, Japan

[21] Appl. No.: 168,380

[22] Filed: Jul. 10, 1980

[30] Foreign Application Priority Data

Apr. 2, 1980 [JP] Japan ................... 55-41995

[51] Int. Cl.³ .................. F16C 7/04; F04B 17/00; F03B 11/06
[52] U.S. Cl. .................. 308/9; 308/DIG. 1; 417/407; 415/170 R
[58] Field of Search .......... 415/110, 111, 112, 170 R, 415/170 B, 104; 417/407; 308/9, DIG. 1

[56] References Cited

U.S. PATENT DOCUMENTS

| 3,090,544 | 5/1963 | Woollenweber, Jr. et al. | 415/111 |
| 3,951,474 | 4/1976 | Hughes et al. | 308/9 |
| 4,251,186 | 2/1981 | Chomel et al. | 415/213 R |
| 4,277,113 | 7/1981 | Heshmat | 308/9 |

Primary Examiner—Michael Koczo
Assistant Examiner—Peter M. Cuomo
Attorney, Agent, or Firm—Stevens, Davis, Miller & Mosher

[57] ABSTRACT

A turbomachine comprising a thrust air bearing for axially supporting the rotary shaft of the turbomachine. The thrust air bearing comprises a disc shaped hollow runner fixed onto the rotary shaft, and a pair of stationary bearing plates fixed onto the housing of a turbocharger on each side of the runner. The runner has a thin wall defining an interior chamber therein. A plurality of air inflow bores is formed on the side wall of the runner for feeding ambient air into the interior chamber, and a plurality of air outflow bores is formed on the circumferential outer wall of the runner for discharging the air within the interior chamber into the atmosphere.

6 Claims, 9 Drawing Figures

BEARING OF A TURBOMACHINE

DESCRIPTION OF THE INVENTION

The present invention relates to a turbomachine, and particularly relates to a turbocharger for use in an internal combustion engine.

The rotary shaft of a turbomachine is normally supported by a radial bearing and a thrust bearing. In the case wherein a load, which the radial bearing is subjected to, is small in such a turbomachine, a radial air bearing can be used for supporting the rotary shaft of a turbomachine. If such a radial air bearing is used, there are advantages in that the friction loss can be reduced, and a lubricant is not necessary. In addition, there is a further advantage in that a lubricant is not mixed with a fluid used for operating a turbomachine. However, the above-mentioned advantages are considerably reduced in the case wherein a thrust bearing, which is lubricated by lubricating oil, is used. Consequently, in order to ensure the above-mentioned advantages, it is necessary to adopt a thrust air bearing. In a turbomachine, in general, since a load to which a thrust bearing is subjected is greater than a load to which a radial bearing is subjected, if a thrust air bearing having a small load capacity per unit area is used, it is necessary to increase an area of the bearing surface of the thrust air bearing, which surface is subjected to pressure. That is, it is necessary to increase the outer diameter of the rotary runner fixed onto the rotary shaft and comprising the thrust air bearing. However, if the outer diameter of the runner is increased, the inertia of the rotary runner is increased. As a result of this, for example, in a turbocharger which is required to rotate within a wide range of rotating speeds, a problem occurs in that the responsiveness of the turbocharger, relative to a change in the rotating speed of an engine, will deteriorate.

An object of the present invention is to provide a turbomachine capable of: reducing the friction loss; ensuring good responsiveness relative to a change in the engine speed; and preventing lubricating oil from being mixed with a fluid used for operating the turbocharger.

According to the present invention, there is provided a turbomachine having a housing, a rotary shaft rotatably inserted into said housing, and a non-contact type thrust air bearing for axially supporting the rotary shaft under a non-contacting state, wherein said thrust air bearing comprises a disc shaped hollow runner fixed onto the rotary shaft, and a pair of stationary bearing plates fixed onto the housing on each side of said runner and arranged to be spaced from said runner by a slight distance, said runner comprising a pair of opposite thin side walls, a cylindrical thin inner wall and a cylindrical thin outer wall, which define an interior chamber in said runner.

The present invention may be more fully understood from the description of a preferred embodiment of the invention set forth below, together with the accompanying drawings.

DESCRIPTION OF A PREFERRED EMBODIMENT

Figure 1:
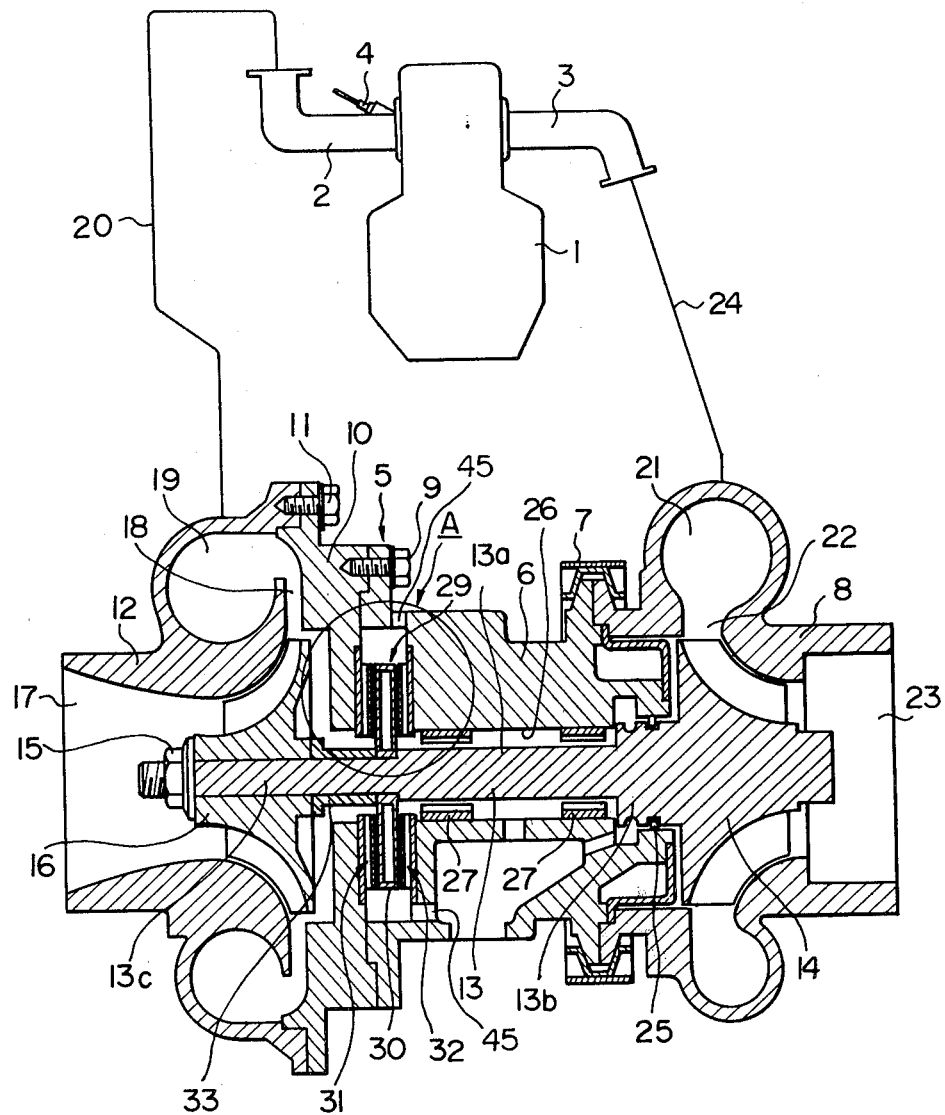
FIG. 1 is a cross-sectional side view of a turbocharger according to the present invention.

Referring to FIG. 1, 1 designates an engine body, 2 an intake manifold, 3 an exhaust manifold, 4 a fuel injector, and 5 a turbocharger. The turbocharger 5 comprises a center housing 6, a turbine housing 8 secured onto one end of the center housing 6 by a band 7, a compressor plate 10 secured onto the other end of the center housing 6 by bolts 9, a compressor housing 12 secured onto the compressor plate 10 by bolts 11, a rotary shaft 13 rotatably inserted into the inside of the center housing 6, a turbine wheel 14 formed in one piece on one end of the rotary shaft 13, and an impeller 16 fixed onto the other end of the rotary shaft 13 by a nut 15. An air inlet 17, a vaneless diffuser 18 and a scroll shaped air discharge chamber 19 are formed in the compressor housing 12, and the air discharge chamber 19 is connected to the intake manifold 2 via an air duct 20. Furthermore, the turbine housing 8 has a scroll shaped exhaust gas inflow chamber 21, a turbine nozzle 22 and an exhaust gas outlet 23 therein, and the exhaust gas inflow chamber 21 is connected to the exhaust manifold 3 via an exhaust duct 24. When the engine is operating, the compressed air within the air discharge chamber 19, which is compressed by the rotating motion of the impeller 16, is fed into the intake manifold 2 via the air duct 20. Then, fuel is injected from the fuel injector 4 into the air which is fed into the intake manifold 2 and, thus, a mixture is formed within the intake manifold 2. After this, the mixture thus formed is fed into the cylinders of the engine body 1. The exhaust gas, discharged from the cylinders of the engine body 1 into the exhaust manifold 3, is fed into the exhaust gas inflow chamber 21 via the exhaust duct 24. The exhaust gas, fed into the exhaust gas inflow chamber 21, is injected from the turbine nozzle 22 to provide the rotating force for the turbine wheel 14 and, then, the exhaust gas is discharged from the exhaust gas outlet 23.

Figure 2:
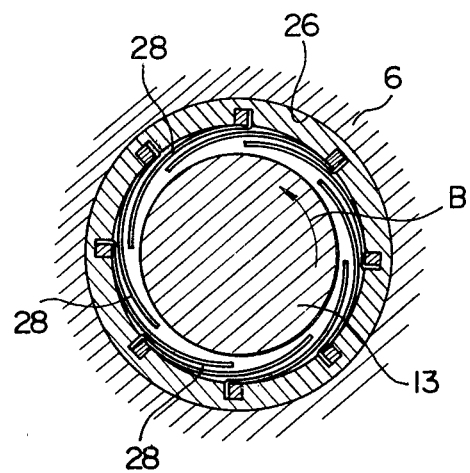
FIG. 2 is a cross-sectional side view of the radial air bearing illustrated in FIG. 1.

As illustrated in FIG. 1, the rotary shaft 13 comprises a central portion 13a, an increased diameter portion 13b and a reduced diameter portion 13c. A piston ring 25 for sealing is inserted between the center housing 6 and the increased diameter portion 13b of the rotary shaft 13. In addition, a pair of spaced radial air bearings 27 are arranged within a cylindrical bore 26 which is formed within the central housing 6. The rotary shaft 13 is rotatably supported by a pair of the radial air bearings 27. As illustrated in FIG. 2, each of the radial air bearings 27 is constructed, for example, in the form of a foil type radial air bearing comprising a plurality of foils 28, each extending along the circumferential outer wall of the rotary shaft 13. In such a foil type radial air bearing, when the rotary shaft 13 rotates in the direction illustrated by the arrow B in FIG. 2, ambient air is sucked into the clearance between the foils 28 and the rotary shaft 13 via the clearance between the adjacent foils 28 and, as a result, the rotary shaft 13 is supported in a non-contacting state by the air thus sucked.

Figure 3:
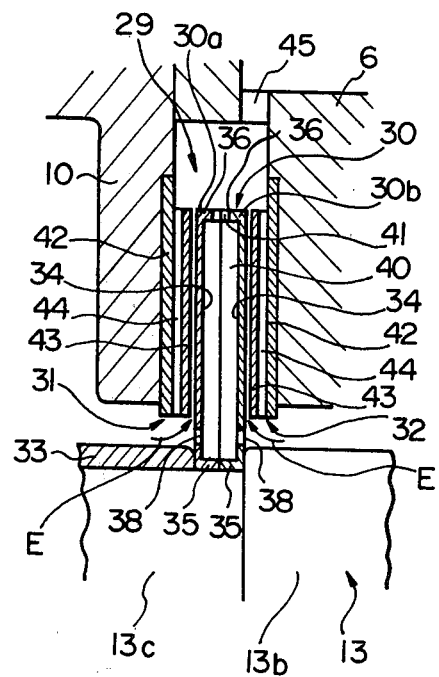
FIG. 3 is an enlarged cross-sectional side view, illustrating the portion enclosed by the circle A in FIG. 1.
Figure 4:
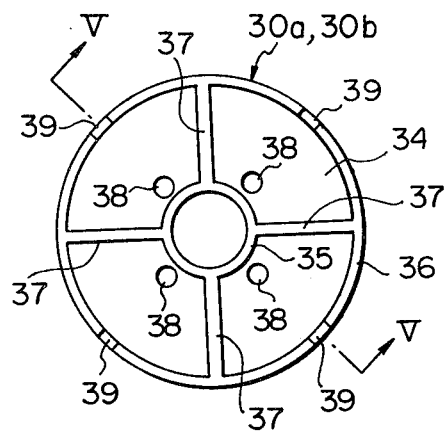
FIG. 4 is a front view of the runner half.
Figure 5:
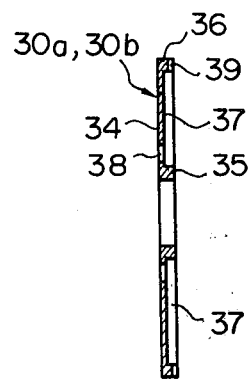
FIG. 5 is a cross-sectional side view, taken along the line V—V in FIG. 4.

Turning to FIG. 1, in order to axially support the rotary shaft 13, a thrust air bearing 29 is arranged on the reduced diameter portion 13c of the rotary shaft 13. The thrust air bearing 29 comprises a disc shaped rotary runner 30, and a pair of stationary bearing plates 31, 32, each being spaced from the corresponding side wall of the runner 30 by a slight distance and arranged to face the corresponding side wall of the runner 30. The runner 30 is fixed onto the reduced diameter portion 13c of the rotary shaft 30 in such a way that the runner 30 is urged onto the step portion, formed in the connecting portion of the reduced diameter portion 13c and the central portion 13a, via a spacer 33 and the impeller 16 by the nut 15. In addition, the stationary bearing plate 31 is fixed onto the compressor plate 10, and the stationary bearing plate 32 is fixed onto the center housing 6. As illustrated in FIGS. 3 through 5, the runner 30 comprises a pair of runner halves 30a and 30b having the same shape. Each of the runner halves 30a and 30b comprises an annular outer side wall 34 having a thin thickness, a hollow cylindrical portion 35 formed in one piece on the inner end of the outer side wall 34 and having a thin thickness, and a hollow cylindrical portion 36 formed in one piece on the outer end of the outer side wall 34 and having a thin thickness. The hollow cylindrical portion 35 has an inner diameter which is equal to the outer diameter of the reduced diameter portion 13c of the rotary shaft 13. In addition, a plurality of ribs 37 for reinforcement, radially extending from the hollow cylindrical portion 35 to the hollow cylindrical portion 36 and axially extending by a length which is the same as the hollow cylindrical portions 35, 36, is formed in one piece on the outer side wall 34. A plurality of air inflow bores 38 is formed in the outer side wall 34 at a position near the hollow cylindrical portion 35, and a plurality of semi-circular shaped grooves 39 is formed on the hollow cylindrical portion 36. Consequently, when the runner halves 30a and 30b are interconnected to each other so that the ribs 37 and the semi-circular shaped grooves 39 of the runner half 30a are aligned with the corresponding ribs 37 and the corresponding semi-circular shaped grooves 39 of the runner half 30b, an interior chamber 40 is formed in the runner halves 30a and 30b. In addition, each pair of the semi-circular shaped grooves 39, which are aligned with each other, forms air outflow bores 41.

Figure 6:
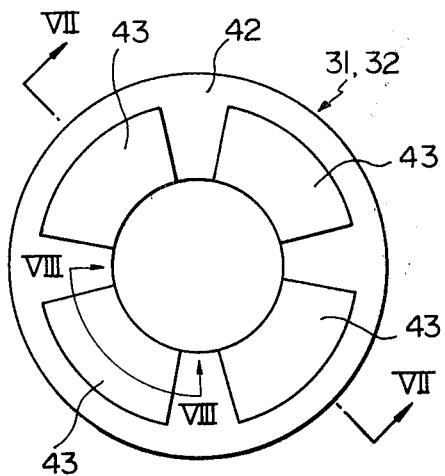
FIG. 6 is a front view of a stationary bearing plate.
Figure 7:
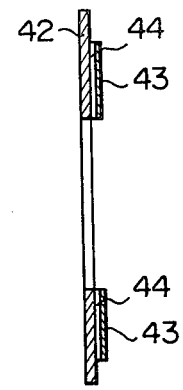
FIG. 7 is a cross-sectional side view, taken along the line VII—VII in FIG. 6.
Figure 8:
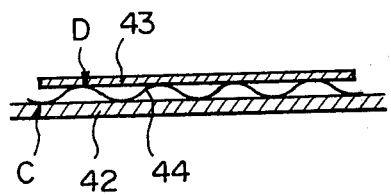
FIG. 8 is a cross-sectional side view, taken along the line VIII—VIII in FIG. 6.
Figure 9:
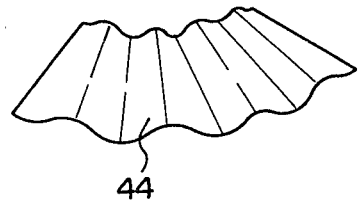
FIG. 9 is a perspective view of a corrugated plated spring illustrated in FIG. 8.

As illustrated in FIGS. 3, 6 and 7, each of the stationary bearing plates 31, 32 comprises an annular backplate 42, a plurality of sector shaped foils 43, and a plurality of plate springs 44, each being inserted between the backplate 42 and the corresponding foil 43. The backplate 42 of the stationary bearing plate 31 is fixed onto the compressor plate 10, and the backplate 42 of the stationary bearing plate 32 is fixed onto the center housing 6. The foils 43 of the stationary bearing plates 31, 32 are arranged to be spaced from the side surface 38 of the runner 30 by a slight distance. In addition, as illustrated in FIGS. 8 and 9, each of the plate springs 44 is formed in the form of a corrugated plate spring. Each of the corrugated plate springs 44 is fixed onto the backplate 42 at the point C in FIG. 8, and also fixed onto the foil 43 at the point D in FIG. 8. Consequently, each of the foils 43 can move relative to the backplate 42.

In FIG. 3, when the rotary shaft 13 rotates, ambient air is sucked into the clearance between the opposite outer side walls 34 of the runner 30 and the foils 43 as indicated by the arrow E and, thus, the runner 30 is supported in a non-contacting state by the foils 43. Also, when the rotary shaft 13 rotates, ambient air flows into the interior chamber 40 of the runner 30 from the air inflow bores 38 and then the air, fed into the interior chamber 40, is discharged into the atmosphere via the air outflow bores 41 and air discharge holes 45 formed in the center housing 6. During the time the air, fed into the interior chamber 40 from the air inflow bores 38, flows within the interior chamber 40 towards the air outflow bores 41 due to the centrifugal force caused by the rotation of the runner 30, the runner 30 is cooled by the air and, as a result, overheating of the runner 30 is prevented.

According to the present invention, the outer side walls 34 of the runner 30 have a thin thickness. Consequently, since the inertia of the runner 30 is considerably reduced as compared with that of a conventional runner, the responsiveness of the turbocharger 5, relative to a change in the engine speed, can be improved over that of the prior art. In addition, since the runner 30 is cooled by the air flowing within the interior chamber 40, the overheating of the runner 30, which is caused by the heat of viscous friction, can be prevented. Furthermore, since the ribs 37 for reinforcement are formed in one piece on the runner 30, it is possible to ensure a high rigidity of the runner 30. In addition, unbalance of the runner 30 can be easily adjusted by merely forming a cut away portion on the ribs 37. Furthermore, by forming the runner 30 by a pair of the runner halves 30a, 30b, the runner 30 can be formed by a injection machine and, as a result, it is possible to reduce the manufacturing cost of the runner 30.

While the invention has been described by reference to a specific embodiment chosen for purposes of illustration, it should be apparent that numerous modifications could be made thereto by those skilled in the art without departing from the spirit and scope of the invention.

I claim:

1. A turbomachine having a housing, a rotary shaft rotatably inserted into said housing, and a non-contact type thrust air bearing for axially supporting the rotary shaft, wherein said thrust air bearing comprises a disc shaped hollow runner fixed onto the rotary shaft, and a pair of stationary bearing plates fixed onto the housing on each side of said runner and arranged to be spaced from said runner by a slight distance, said runner comprising a pair of opposite thin side walls, a cylindrical thin radially inner wall and a cylindrical thin radially outer wall, which define an interior chamber in said runner, and wherein neither the runner nor the shaft contacts the housing or the bearing plates.

2. A turbomachine as claimed in claim 1, wherein said runner comprises a pair of runner halves having the same construction, each of said runner halves having said side wall, a cylindrical radially inner wall portion forming a portion of said cylindrical inner wall, and a cylindrical radially outer wall portion forming a portion of said cylindrical outer wall.

3. A turbomachine as claimed in claim 1, wherein each of said stationary bearing plates comprises a plurality of flat foils arranged to be spaced from the side walls of said runner, and a plurality of springs, each being arranged between said corresponding foil and said housing.

4. A turbomachine as claimed in claim 1, wherein said turbomachine further comprises a non-contact type radial air bearing for radially supporting the rotary shaft in a non-contacting state with respect to the housing.

5. A turbomachine having a housing, a rotary shaft rotatably inserted into said housing, and a non-contact type thrust air bearing for axially supporting the rotary shaft, wherein said thrust air bearing comprises a disc shaped hollow runner fixed onto the rotary shaft, and a pair of stationary bearing plates fixed onto the housing on each side of said runner and arranged to be spaced from said runner by a slight distance, said runner comprising a pair of opposite thin side walls, a cylindrical thin radially inner wall and a cylindrical thin radially outer wall, which define an interior chamber in said runner, and wherein neither the runner nor the shaft contacts the housing or the bearing plates, wherein a plurality of air inflow bores, interconnecting said interior chamber to the atmosphere, is formed on the side walls of said runner at a position near the rotary shaft, and a plurality of air outflow bores, interconnecting said interior chamber to the atmosphere, is formed on the cylindrical outer wall of said runner.

6. A turbomachine having a housing, a rotary shaft rotatably inserted into said housing, and a non-contact type thrust air bearing for axially supporting the rotary shaft, wherein said thrust air bearing comprises a disc shaped hollow runner fixed onto the rotary shaft, and a pair of stationary bearing plates fixed onto the housing on each side of said runner and arranged to be spaced from said runner by a slight distance, said runner comprising a pair of opposite thin side walls, a cylindrical thin radially inner wall and a cylindrical thin radially outer wall, which define an interior chamber in said runner, and wherein neither the runner nor the shaft contacts the housing or the bearing plates, wherein said runner further comprises a pair of runner halves having the same construction, each of said runner halves having said side wall, a cylindrical radially inner wall portion forming a portion of said cylindrical inner wall, and a cylindrical radially outer wall portion forming a portion of said cylindrical outer wall, wherein a plurality of ribs, radially extending from said cylindrical inner wall portion to said cylindrical outer wall portion, is formed on each of the inner surfaces of the side walls of said runner halves.

* * * * *